Dec. 9, 1941.  H. I. JOHNSON  2,265,373
PROPELLER GAUGE
Filed Sept. 14, 1940   3 Sheets-Sheet 2
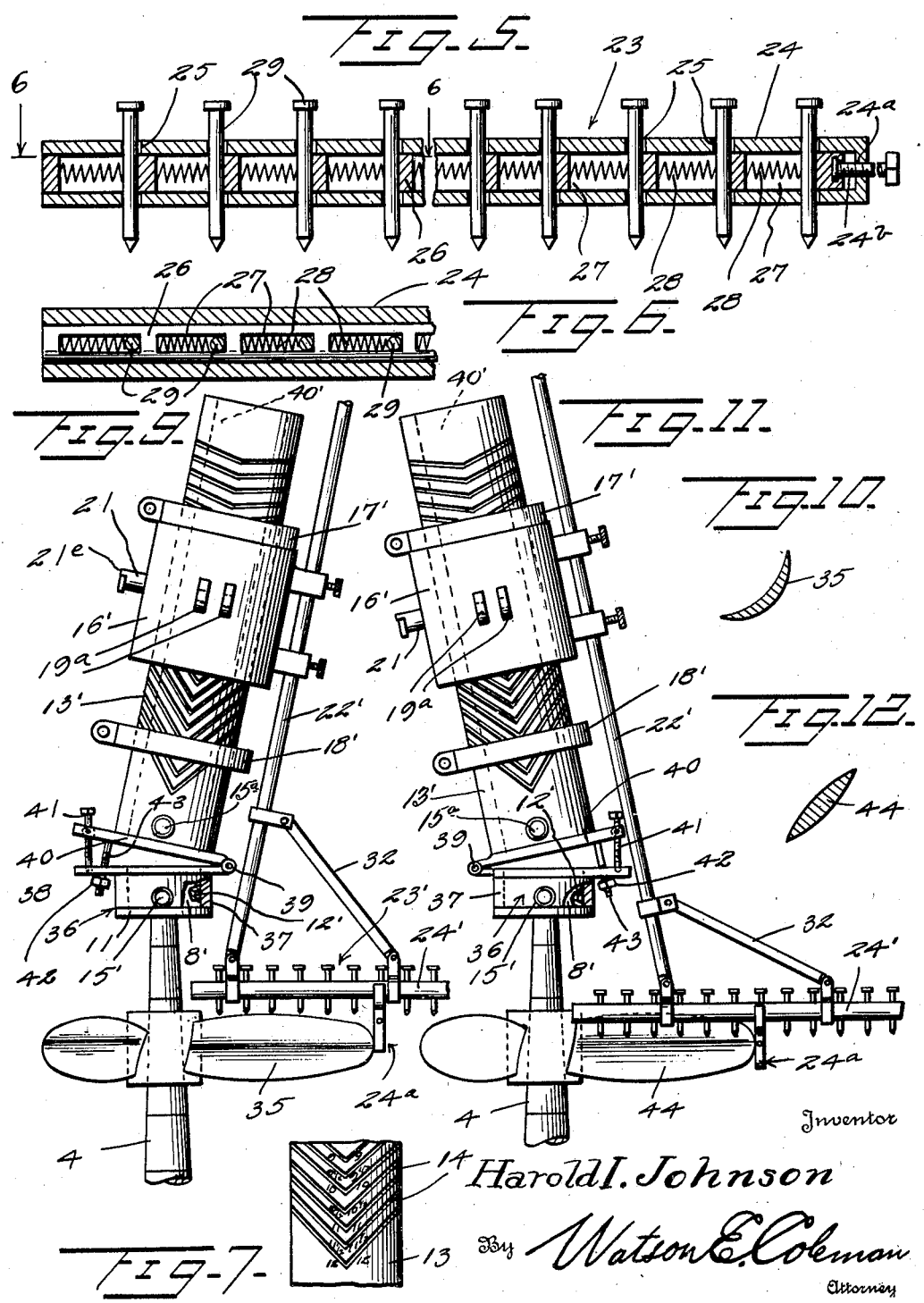

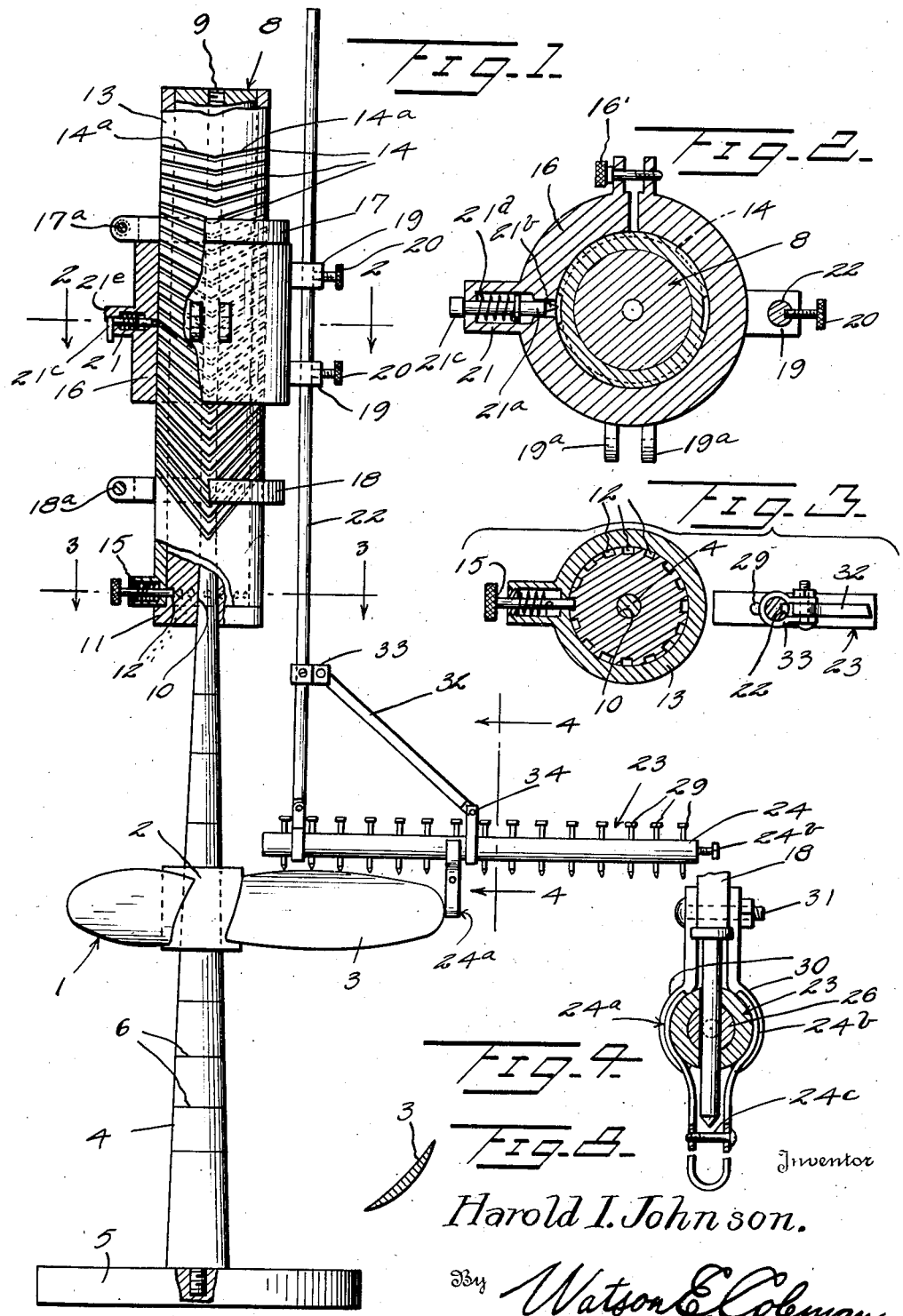

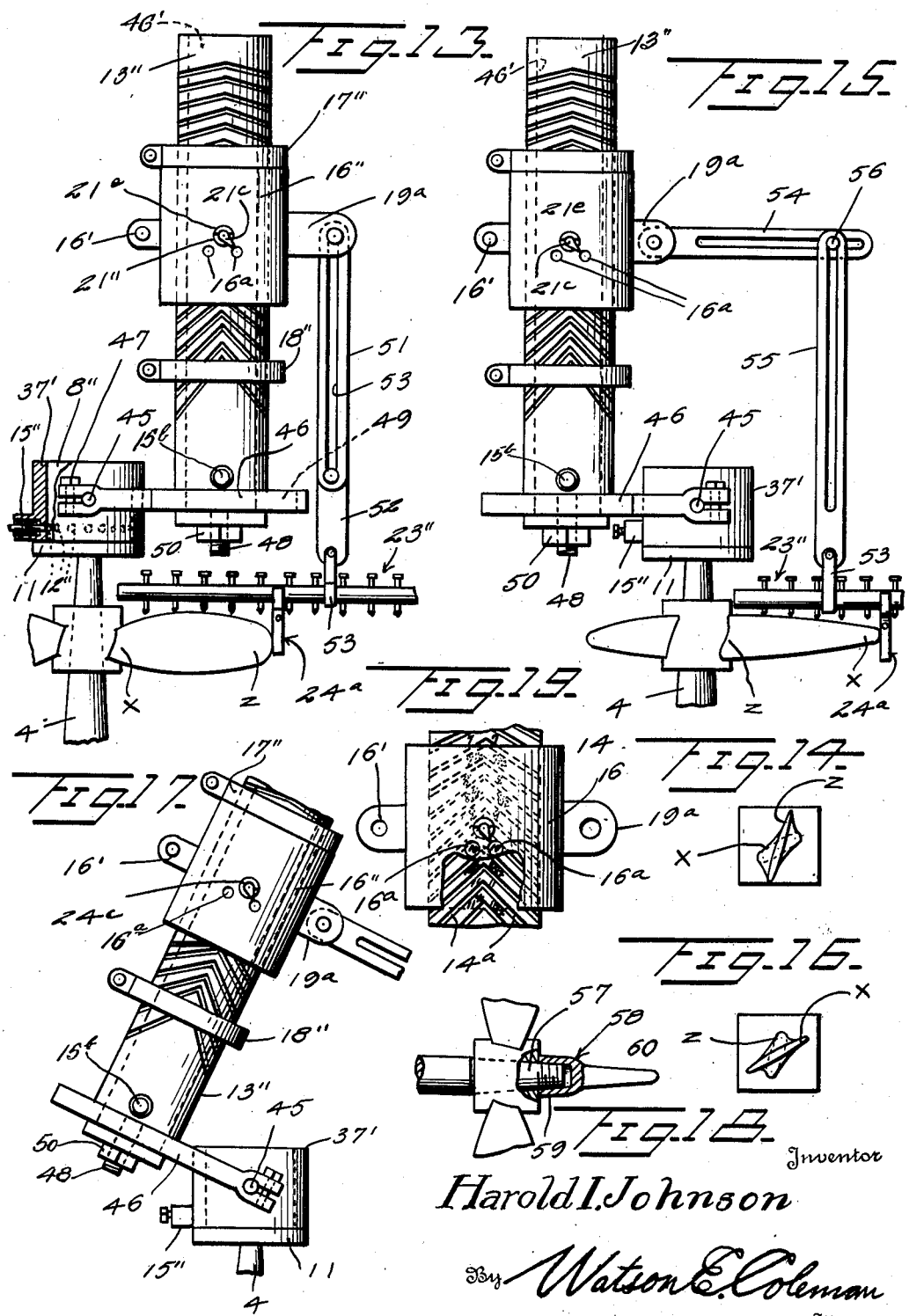

Patented Dec. 9, 1941

2,265,373

UNITED STATES PATENT OFFICE 2,265,373

PROPELLER GAUGE

Harold I. Johnson, Newport Beach, Calif.

Application September 14, 1940, Serial No. 356,865

15 Claims. (Cl. 33—174)

This invention relates to the art of making propeller blades and pertains particularly to improvements in instruments for checking certain features of such blades.

The primary object of the present invention is to provide an improved propeller gauge which can be used in the manufacture and repair of propellers for checking the taper and size of the shaft opening of the propeller hub, the spacing of the blades of a propeller unit having two, three or more blades, the angle of the blades with respect to the shaft opening, the pitch of the propeller blade and the length, width and contour of each of the blades of a propeller structure.

Another object of the invention is to provide a gauge instrument for accomplishing the above stated objects, which is of relatively simple design and construction and which does not require any complicated manipulation in using it for checking the various features of a propeller structure, thus making it possible for this gauge to be used by ordinary mechanics having no special training or education in mathematics or in propeller design.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 illustrates a standard form of the gauge instrument embodying the present invention, showing the same in combination with a supporting arbor on which the propeller unit may be mounted, such arbor constituting an element of the instrument for checking the taper and size of the shaft hole of the propeller hub.

Fig. 2 is a sectional view on an enlarged scale on the line 2—2 of Fig. 1.

Fig. 3 is a sectional view on an enlarged scale on the line 3—3 of Fig. 1.

Fig. 4 is a sectional view on the line 4—4 of Fig. 1.

Fig. 5 is a vertical longitudinal section through the indicator assembly of the instrument.

Fig. 6 is a horizontal section on the line 6—6 of Fig. 5.

Fig. 7 is a detailed view in elevation of a portion of the pitch head, showing the arrangement of the pitch grooves upon the side opposite from the side shown in Fig. 1.

Fig. 8 is a transverse section through a blade of the propeller shown in Fig. 1.

Fig. 9 is a view in elevation of a modification of the form of the instrument shown in Fig. 1.

Fig. 10 is a transverse section of a blade of the propeller structure shown in Fig. 9.

Fig. 11 is a view in side elevation of a further modified form of the instrument as shown in Fig. 1.

Fig. 12 is a transverse sectional view of a blade of the propeller unit shown in Fig. 11.

Fig. 13 is a view in side elevation of a further modified form of the instrument as shown in Fig. 1.

Fig. 14 is an end view of a blade of the propeller unit shown in Fig. 13.

Fig. 15 is a view in side elevation of another modification of the instrument from the form shown in Fig. 1.

Fig. 16 is an end view of a blade of the propeller unit shown in Fig. 15.

Fig. 17 illustrates the arrangement of the combined offset and angle adapter when using the present invention for checking those propellers having what are known as compound freak pitch blades.

Fig. 18 illustrates the adapter which may be employed for attaching the device to a shaft for the purpose of checking the blades of a propeller while the propeller remains on the shaft.

Fig. 19 is a detail view on an enlarged scale of the collar upon the pitch head looking toward the sight openings and the pitch selector pin and showing the pitch indicating figures on the head.

Referring now more particularly to the drawings, Fig. 1 illustrates the present invention as employed in checking an ordinary straight blade propeller unit, such propeller unit being indicated generally by the numeral 1, while the hub and blades are designated respectively by the numerals 2 and 3. Fig. 8 shows the form in cross-section of a blade 3 of this unit.

The numeral 4 designates an arbor of tapered form, mounted upon a base 5. This arbor is provided at intervals with the circumferential lines 6 indicating diameters along the length of the arbor. These diameters are employed in checking the size and taper of the shaft hole in the hub 2 of the propeller.

At this point, it may be brought out that while in each of the figures where a complete propeller unit is shown, such unit is shown mounted upon an arbor 4, it is only necessary to remove the propeller from its shaft in the use of this instrument when it is desired to check the size and taper of the shaft hole of the propeller. All other operations for the purpose of checking various measurements of a propeller by means of the present device may, if desired, be carried out upon the propeller while the same is supported upon its shaft, by the use of a suitable adapter such as is illustrated in Fig. 18, for attaching the instrument to the shaft, therefore, it will be understood that although the instrument in each of its modifications is shown as being mounted upon an arbor, this arbor might be considered as the supporting shaft for the propeller unit being tested.

For carrying out the various other operations for which the present instrument is designed, in addition to the operation of checking the size and taper of the shaft hole in the propeller hub, there is provided the relatively long cylindrical dividing head 8 through which there extends axially the passage 9 which at its lower end is tapered, as indicated at 10, to receive the tapered end of the arbor 4 or the end of a propeller shaft or the adapter mounted thereon. The other end of the passage 9 is screw threaded as illustrated, so that the divider head may be threaded directly onto the end of a shaft such as the end of an airplane propeller shaft. The end of the head 8 adjacent the tapered portion of the bore is provided with the encircling flange 11 and adjacent to this flange, the body is provided with circumferentially spaced divider notches 12 for the purpose hereinafter described.

Of the same length as the head 8 and adapted to receive the same, is the tubular portion 13 which is termed the pitch head. This pitch head or pitch sleeve is provided with a number of pitch grooves 14 which are arranged in groups lengthwise of the cylinder. These pitch grooves each extends partway around the cylinder and they vary from one end of the group to the other in their angular relation with the axis of the sleeve. Each series of grooves is indicated by the numeral 14$^a$ and the grooves are here shown as extending a quarter of the way around the sleeve. The two series 14$^a$ of the pitch grooves, as shown in Fig. 1, are of right or left-hand and upon the opposite side the cylinder may be provided with two more groups of such grooves having different angular relation to the axis of the sleeve for the purpose of checking higher pitches as hereinafter more specifically described.

These pitch grooves are numbered to designate the propeller pitch to which each corresponds and the grooves may be arranged on one side of the sleeve to check pitches from 4 to 10″ and increasing by ¼″ increments while on the other side of the sleeve, the grooves may be arranged for checking propellers of from 10 to 20″ pitch changing or varying by ½″ increments. The grooves which vary by ¼″ increments would be employed in checking propellers used upon racing boats as such propellers have only a ¼″ difference in pitch between sizes.

Obviously other pitch heads or sleeves may be provided so that they may be made interchangeable for use upon the divider but only one such head is here shown and described.

At the lower end of the head 13, there is located the selector pin 15, which has selective engagement in the notches 12 of the dividing head so as to secure the pitch head in any desired position upon the dividing head which will facilitate the carrying out of the gauging or checking operations.

The numeral 16 designates a longitudinally split collar which, as shown in Fig. 2, is closed around the pitch sleeve by a clamping or locking screw 16′, which connects together the spaced edges of the collar. This collar moves or travels longitudinally on the pitch head and its travel is limited by the upper and lower split stop rings 17 and 18. These rings have their ends connected by the adjoining closing screws 17$^a$, 18$^a$ which are employed for tightening the rings about the head so as to secure the rings in place.

Upon one side the collar 16 carries the longitudinally spaced apertured ears 19, the apertures of the ears being directed longitudinally of the collar and in alinement. Each of the ears carries a set screw 20 which may be extended into the aperture thereof.

The collar 16 also carries the spaced apertured ears 19$^a$ which are employed as hereinafter described for supporting the indicator unit hereinafter described.

In addition to the foregoing, the collar 16 is provided with two or more guides 21, each of which has slidably and rotatably supported therein, a pitch groove selector pin 21$^a$ which at its inner end is shaped to provide a wedge-like tip 21$^b$, while at its outer end it carries a pointer head 21$^c$. Within the guide 21 the pin 21$^a$ is encircled by a coil spring 21$^d$, which at one end bears against a portion of the guide while its other end is connected with the pin so that it normally functions to urge the tip or point of the pin inwardly toward the pitch grooves. At the outer end of the sleeve 21, there is formed a longitudinally projecting shoulder 21$^e$, which is of arcuate form and onto which the head 21$^c$ is positioned when the pin is drawn outwardly against the action of the spring, to effect the maintenance of the pin tip out of engagement with the pitch groove.

In Fig. 7, a means is illustrated for facilitating the determination of the pitch groove within which a pin is engaged. As will be seen in this view, the traveling collar 16 is provided below each of the selector pins with the two sight openings 16$^a$. These sight openings are arranged so that there may be seen through the two adjacent ones thereof the numerals directly beneath a pitch groove in which the adjacent pin is engaged, and the pointer head 21$^c$ of the pin is employed to designate whether the pin is engaged in the right-hand or the left-hand groove of the selected pitch.

Extending in parallel relation with the collar 16 and through the apertures of the alined ears 19 is a rod 22 upon the lower end of which is carried an indicator assembly which is indicated generally by the numeral 23. This indicator assembly consists of the relatively long tubular body 24 which is provided throughout its length with the spaced transversely extending apertures 25. Snugly disposed within the tubular body 24 is a shiftable bar 26 which is provided throughout its length with the short longitudinally extending spaced slots 27. When the bar 26 is within the tube 24, a portion of each of the slots 27 is alined with the two ends of a transverse aperture 25. Within each of the slots 27 is secured an expansion spring 28 which holds in place in the slot and in the adjacent transverse aperture 25, a gauge pin 29.

One end of the tubular body 24 has a wall provided with a threaded aperture 24$^a$ in which is engaged the screw 24ᵇ which is swively connected with the adjacent end of the bar 26, as is shown in Fig. 5. Thus it will be seen that the degree of compression exerted by the springs upon the pins 29 may be regulated by turning the screw 24ᵇ so as to draw the bar 26 in a direction to compress the springs or to relax their tension, as may be desired.

The rod 22 is secured to the ears 19 by the set screws 20 and at its lower end this rod carries a clamp which is here illustrated as comprising two jaw members 30 between which is secured the lower end of the rod 22 by means of a transverse bolt 31, leaving the major portions of the jaws extended beyond the supporting rod to encircle and grip the tube 24 adjacent one end, as shown in Fig. 1. The clamp jaws may be pivoted or rocked upon the bolt 31 if it is desired to angle the jaws with respect to the rod, as in Figs. 9 and 11, thus facilitating the disposition of the rod 22 at an acute or obtuse angle with respect to the indicator assembly.

In order that the indicator assembly may be held in right angular relation with the rod 22, there is provided the brace link 32 which has one end suitably secured as by a clamp member 33 to the rod 22, while its other end is secured as by the clamp 34, to the tube 24 of the indicator.

The line of contact pins 29 extends in parallel relation to the axis of the propeller unit when the instrument is being employed for making checks on the propeller blades.

Mounted upon the tubular body 24 of the indicator is a propeller blade link checking finger indicated generally by the numeral 24ᵃ. This finger may be of any desired form and may be attached to the tubular body in any suitable manner but it is here shown as being shaped from a single piece of resilient metal which is bent intermediate its ends so as to provide the two terminal jaw portions 24ᵇ between which the tubular body is positioned, the jaws being drawn together by a clamp screw 24ᶜ which connects the two parts together, as illustrated in Fig. 4.

In the use of the form of the gauge instrument shown in Fig. 1, when it is desired to check the shaft hole of the propeller for size and taper, the propeller must be taken off of the shaft on which it is supported and placed on the arbor 4. As previously stated, this arbor is provided with gauge lines 6 designating standard hole diameters for propellers. By gauging the position of the propeller hub on the arbor with respect to the gauge line 6, the size of the shaft hole may be readily determined and in order to determine if the shaft hole is of standard taper, a chalk line is drawn lengthwise of the arbor before the propeller is placed in position thereon and by then turning the propeller a few times and then removing it, if the chalk line is entirely obliterated, this will indicate that the hole is of standard taper, otherwise only a portion of the chalk line will be rubbed out.

As previously stated, this is the only check with the present implement which actually requires the removal of the propeller from its shaft, but it will be readily appreciated that when the propeller has been removed from the shaft and placed upon the arbor, the other tests or checks may be readily made thereon.

In checking the spacing of the blades to determine if they are of equal distance apart, the pitch and dividing head are mounted in position, as shown in Fig. 1, with the indicator supported upon the collar of the pitch head, as illustrated. By now adjusting the indicator so that the tips of some of the pins will be in the plane of and contact the trailing edge of one blade at any point thereon, the collar is locked in position on the pitch head. The pin 15 is engaged in one of the divider notches 12, thus holding the divider head and pitch sleeve against relative movement. The number of these divider notches will correspond with the number of blades on the propeller or there may be a greater number of the notches than there are of blades, but it will be assumed that the propeller is a four-blade propeller in which case there would be four of the divider notches equi-distantly spaced around the divider head. After the indicator has been set to the trailing edge of one blade as described and the collar 16 has been clamped onto the divider sleeve by means of the screw 16' so that it cannot move with relation to the sleeve, the pin 15 may then be loosened and the sleeve 13 rotated on the divider head approximately a quarter of a turn or until the screw 15 is in position where it may be engaged with the next one of the divider notches which is a distance of 90° therefrom. The indicator will, of course, be swung also through an arc of 90° and the pins should then contact the trailing edge of the next blade, and if this occurs, then it is known that the blades are properly spaced apart.

The checking of the angle of the blade with respect to the axis of the shaft hole is accomplished by following the same procedure described in connection with the checking of the blade spacing except that the points or tips of the indicator pins are placed along the center of the blade or on any line extending lengthwise thereof. This check is comparative between the blades of the propeller to show if the angle of all of the blades is the same. The actual angle of the blades may be determined by the use of an ordinary protractor.

The lengths of the blades of the propeller are checked to see that all are the same, simultaneously with the making of the foregoing checks, by the employment of the length indicating finger 24ᵃ which is attached to the indicator unit. This finger is set against the end of the first blade and thus when the indicator assembly is moved around to the succeeding blades, the finger should assume the same position with respect to such succeeding blades as it had with respect to the first blade. By locking the collar 16 on the pitch head when the indicator is disposed along the center of a blade, measurements can be taken from the indicator points or pins to the edge of the blade. The indicator can then be turned to the next blade and placed with the pins along the center of that blade and measurements can be taken at the same points on the second blade as were taken on the first blade, such points being indicated by the pins. In this way, relative widths of the blades can be readily determined without the necessity of following the procedure which is followed at the present time and which consists in scribing a center line along each blade and then striking radius lines across the blades at every inch along the longitudinally drawn line and measuring from the line intersections to the edges of the blade. This gives a comparative check of the blade areas but the operation can be more quickly and accurately carried out by the use of the indicator assembly and measuring from the points of the pins on the blade rather than by laying off lines thereon as stated. A comparative check of the contours of the blades can be made by placing the indicator along the edge of the blade and shifting the pins transversely of the indicator until each engages the edge of the blade. In this manner, the points of the pins will define a line corresponding to the contour of the blade edge and by then turning the indicator assembly to the next blade, this line should check with the edge of the next blade to show that the contours of the blades are the same.

In determining the correctness of the pitch of the propeller, the pitch and dividing heads are secured together by the pin 15 and the traveling collar is moved to a position where one of the pitch selector screws when released, will move inwardly and have its tip 21$^b$ engaged in the groove of the proper pitch to correspond to the pitch of the propeller. The stop rings 17 and 18 are used to limit the travel of the indicator and the traveling collar 16 so that when the collar is turned on the pitch head, it will be caused to travel longitudinally of the head through the engagement of the selector pin in the selected pitch groove to move the indicator pins across the face of the blade. At the start of the check, the indicator assembly may be set to contact the face of the propeller blade at the trailing edge or it may be set to proper position on a blade. By then rotating the collar in the proper manner on the pitch head, the collar will be caused to shift longitudinally thereof as stated, and if the propeller blade is of the proper pitch, the points of the pins 29 will travel over the face of the blade and maintain their relative positions with relation to such face throughout their entire path of movement. The pitch head may then be rotated on the dividing head to the next blade position and the check repeated. Any variation in the pitch of any one of the blades from normal will be readily noted by changes in the clearance between the points of the indicator pins and the surface of the blade. In other words, any deformity in the blade surface will be easily noted by the fact that the tips of the pins will miss the surface of the blade or will be pressed into contact with the surface so as to be shifted out of their former positions. The stop rings 17 and 18, of course, function to maintain the collar within its proper limits in its movement longitudinally on the sleeve. The indicator is then moved until the tips of the pins hit the trailing edge of the propeller and the indicator is then secured in place by tigthening the screws 20. The pins after being shifted to conform to the contour of the blade surface will be held in place by the springs engaging them. The check-up on the pitch of the propeller blade is now carried out by rotating the collar and watching the indicator pins as they follow down the surface of the blade. Any deformity in the blade surface will be easily noted by the fact that the tips of the pins will miss the surface of the blade or will be pushed out by a part which extends beyond the rest of the surface.

In checking spoon or hollow blades or blades known as roll or oval blades, it is necessary to employ in association with the divider head, pitch head, collar and indicator assembly, a supporting angle adapter such as is shown in each of Figs. 9 and 11.

In Fig. 9, the angle adapter is shown in position for use in checking a spoon or hollow type blade, a cross-section of which blade is shown in Fig. 10. This particular blade is indicated by the numeral 35 and is shown upon the tapered arbor 4. In this construction the angle adapter is indicated generally by the numeral 36 and comprises a divider head 8' which is provided at its lower end with the encircling flange 11', and this divider is formed to fit on the end of the arbor or upon the end of a propeller shaft in the same manner as the divider head 8. The divider head 8' is provided with divider notches 12' and encircling the head is the rotating collar 37, which is provided with a pin 15', corresponding with the pin 15 in the form of the invention shown in Fig. 1. Integral with the rotary collar 37 is a plate 38 to one side of which is hingedly coupled, as at 39, a corresponding plate 40. The plates 39 and 40 are angularly adjusted by means of the adjustment screw 41 and after they have been moved to the desired angular relation, they are fixed by the tightening nut 42 which is threaded onto the screw 43, which is fixed at one end to one plate and extends through the other plate, as shown.

The upper plate 40 of the angle adapter carries a post 40' on which is mounted the pitch head 13', which is secured to the post by a lock pin 15$^a$, corresponding to the pin 15 of Fig. 1. This pitch head carries the collar 16' and the stop rings 17 and 18. As will be readily seen, these parts are all duplicates of the parts shown in Fig. 1 and are assembled in the same manner and adjusted and held together by the same means as the parts 8 and 13 of the structure of Fig. 1. The indicator here indicated by the numeral 23' is set so that the pin carrying tubular bar portion 24' is parallel with the blade 35 and the rod 22' is parallel with the axis of the divider head. This acute angular relation between the parts 22' and 24' is permitted by the hinge joint which couples the rod with the indicator. In checking a blade of the spoon or hollow type such as is indicated by the numeral 35, the angle adapter is set so that the pitch head will lean over the blade being tested or, in other words, the hinge 39 will be upon the same side of the propeller as the blade being checked. Thus all of the checks on this type of blade may be made as may be made with the structure shown in Fig. 1.

In checking a blade of the roll or oval type such as is indicated at 44 in Figs. 11 and 12, the angle adaptor 36 is employed but it is set so that the pitch head will lean away from the side of the propeller on which is the blade being checked. In other words, the hinge 39 will be upon the far side of the propeller unit from the blade being checked and the rod 22' will have an obtuse angular relation with the indicator bar 24' as shown.

Figs. 13 and 15 show the use of an offset and angle adapter in association with the indicator assembly, and pitch head in checking propellers having varying pitch blades.

Fig. 13 shows the manner in which the offset adapter supports the checking units of the gauge device in checking a blade wherein the pitch at the tip or at Z is less than at X or the root, whereas Fig. 15 shows the manner in which the adapter supports the checking units of the gauge when checking a blade in which the pitch at Z or at the root is less than at X or at the tip. The offset and angle adapter shown in Figs. 13 and 15 comprises a divider head 8" corresponding to the divider heads 8 and 8' and adapted to position upon the end of the arbor or upon the end of a shaft on which the propeller blade is mounted. This divider head 8" at its lower end is formed to have the encircling flange 11" and it is provided with divider notches 12". Encircling the divider head 8" is a rotating collar 37' which is provided at diametrically opposite points with trunnion pins 45 to which is oscillatably secured an arm 46. This collar 37' carries a pin 15" for selective engagement in the divider notches 12".

The inner end of the arm 46 is forked and the end of each fork is split to receive the trunnions 45 as illustrated, and these split ends are drawn together to tighten them upon the trunnions by a suitable screw 47.

The arm 46 has secured thereto the post 46', by means of the threaded stem 48 extending through a suitable slot 49 in the arm and receiving the nut 50. On this post is mounted the pitch head 13" which is locked to the post by a pin 15ᵇ corresponding with the pin 15.

Upon the pitch head is carried the collar 16" which is of the same construction as the collar 16 and above and below the collar are secured the movement limiting or stop rings 17", 18", the selector pin of this collar being indicated by the numeral 21".

In checking a blade of the type illustrated in Figs. 13 and 14, that is, where the pitch at the tip or at Z is less than at X, the arm 46 is set to extend over and parallel with the blade.

The indicator assembly here generally designated by the numeral 23" is supported from the collar 16" by the ears 19ᵃ and the pair of links 51 and 52, the lower link 52 being secured by the clamp 53 to the indicator while the upper link has one end attached to the ears 19ᵃ, as shown. The upper link is longitudinally slotted, as indicated at 53', thus permitting relative adjustment between the ears 19ᵃ and this upper link when the collar 16" has to be set in different positions on the pitch head.

The same construction as that described in connection with Fig. 13 is employed, as previously stated, in checking blades wherein the pitch at X or at the tip is greater than at Z, but the arm 46 is arranged to extend from the side of the propeller hub opposite that from which the blade which is being checked extends and there is then used in place of the links 51 and 52, the longitudinally slotted links 54 and 55. One of these links is pivotally coupled to the ears 19ᵃ while the other one is pivotally coupled to the clamp 53 which connects it with the indicator assembly and the links are disposed in crossed relation and adjustably joined together by a suitable binding screw 56 which passes through the slots of the links.

It will be understood that the use of the gauge for making the various checks, when the offset adapter is employed, is the same as described in connection with the structure shown in Fig. 1.

Fig. 17 illustrates the manner in which the angle and offset adapter, which is shown in Figs. 13 and 15, is set for the purpose of checking the various features of a propeller in which the blades are of the so-called compound freak pitch. It will, of course, be recognized that all of the parts shown in Fig. 17 are the same as those shown in Figs. 13 and 15, and consequently the same reference numerals apply.

In Fig. 18 there is shown the adapter which may be applied to the end of a propeller supporting shaft to facilitate the application to the shaft of the mechanism described for the checking of the various features of the propeller blades. The tapered end portion of the shaft is indicated by the numeral 57 and the adapter is generally indicated by the numeral 58. As shown, this adapter comprises a portion 59 which is tapped and threaded for attachment to the threaded end of the propeller shaft and a relatively long tapered portion 60 which is adapted to enter the tapered part 10 of the divider head of the structure shown in Fig. 1 or the corresponding tapered openings in the divider heads of the forms of the invention shown in Figs. 9, 11, 13 and 15.

From the foregoing description, it will be readily understood how the device is used for checking a propeller structure when the device is mounted upon the adapter of Fig. 18.

What is claimed is:

1. An instrument for use in the manufacture of propellers, comprising a body designed to be connected with the propeller on the axis line of the propeller, a pair of cylindrical bodies in telescoped relation, one of said cylindrical bodies having helical pitch grooves therein, an operative coupling between one of said cylindrical bodies and the first body by which a turning relation exists between the first body and the said one of the pair of bodies, means for coupling the pair of cylindrical bodies for relative spiral movement, the coupling means being engaged in one of said helical grooves, a propeller blade traversing instrument and, an operative coupling between said traversing instrument and one of said pair of bodies which is so constructed and arranged that the extent and character of the movement of the traversing instrument will be controlled by the spiral movement of the body to which it is attached on the other one of the pair of bodies.

2. An instrument for use in the manufacture of propellers, comprising a propeller support in the form of an arbor, spindle and the like, a body attached to said support by which it maintains a position on the axis line of the propeller, a pair of bodies disposed one within the other and formed to have relative rotation, said pair of bodies being connected as a unit with the first body for movement relative thereto about said axis, said pair of bodies having relative spiral movement, a propeller blade traversing instrument, an operative coupling between said traversing instrument and one of the pair of bodies which is so constructed and arranged that the extent and character of the movement of the traversing instrument will be controlled by the relative spiral movement between the body with which the instrument is connected and the other one of the pair of bodies, and a positive connection between the pair of bodies for regulating the lead of the said relative spiral movement therebetween.

3. An instrument for use in the manufacture of propellers, comprising a support for a propeller in the nature of an arbor, spindle and the like, a head designed to be mounted upon the support on the axis line of the propeller for turning on such line, a cylindrical body operatively coupled with said head to turn about said axis as a center, a collar encircling the cylindrical body, means forming an operative coupling between the collar and the cylindrical body for effecting relative spiral movement between the collar and cylindrical body upon the rotation of one thereof, and a propeller blade face traversing instrument operatively coupled with one of said bodies and moved thereby upon the execution of the relative spiral movement between the bodies, the extent and character of the blade traversing instrument being controlled solely by the spiral movement of one of said bodies relative to the other.

4. A propeller blade gauge of the character described, comprising an elongated body of circular cross-section and having a plurality of spirally directed grooves of right and left-hand formed therein, means for mounting said body adjacent to a propeller blade for turning around the axis of rotation of the propeller blade, a collar encircling the body and having longitudinal movement thereon, means carried by the collar for sliding engagement in a selected one of said grooves whereby the collar when rotated is caused to move longitudinally of the body, and a propeller blade face traversing instrument connected with and carried by the collar, the said selected one of the grooves being designed to cause the instrument to move with respect to the propeller blade face along a path corresponding with the pitch of the blade.

5. A propeller checking gauge of the character described, comprising an elongated body of circular cross-section, means for mounting said body in connection with a propeller blade for the turning of the body around the axis of rotation of the propeller blade, a collar encircling the body, means for securing the collar in a selected position of adjustment on the body, an indicator unit connected with the collar for adjustment on the collar relative to a propeller blade, and means for securing the elongated body at predetermined selected stations spaced around the axis and to which the body is turned about said axis.

6. A propeller checking gauge, comprising an elongated body of circular cross-section, a second body encircling the elongated body and designed to move longitudinally thereof, means for supporting said elongated body adjacent to a propeller unit and for movement with respect thereto and on the axis of rotation thereof, an indicator carried by one of said bodies and having a portion arranged to extend longitudinally of a face of a blade of the said propeller, and a cooperative coupling means between said bodies which effects the movement of the indicator carrying body on a spiral path with respect to the other body and the corresponding movement of the said portion of the indicator across the face of the propeller blade to follow the pitch thereof.

7. A propeller checking gauge, comprising an elongated body having a pitch groove formed therein and extending at an angle to the axis thereof, a collar encircling the elongated body, a retractible finger carried by the collar and adapted to have sliding engagement in said pitch groove, means for coupling the body with a propeller for the rotational movement of the body on the rotary axis of the propeller, means for securing said body at selected stations to which it may be rotated on said axis corresponding with the number of blades upon the adjacent propeller, and an indicator connected with the collar and comprising a bar extending longitudinally of the body and an angularly directed arm connected with the bar and adapted to extend longitudinally of a propeller blade, said arm carrying a plurality of blade face traversing pins.

8. A propeller checking gauge of the character described, comprising an elongated body of circular cross-section having a plurality of grooves extending in a circumferential direction therein, the grooves being at different angles with respect to the long axis of the body and corresponding with predetermined pitches of propeller blades, means for mounting said body in an upright position and in a fixed relation with respect to the rotary axis of the propeller, said means facilitating the turning of the body by predetermined steps with respect to said axis, a collar encircling the body and adapted to have longitudinal movement thereon, a shiftable coupling pin carried by the collar for selective engagement in said grooves whereby rotary movement may be imparted to the collar simultaneously with its longitudinal movement on the body, and an indicator unit attached to the collar and comprising one portion which is coupled to the collar and a second portion which is coupled to the said one portion and which is arranged to extend longitudinally of a face of a blade of the adjacent propeller, the said second portion carrying a plurality of transversely shiftable propeller blade contacting pins.

9. A propeller checking gauge of the character described, comprising a cylinder having formed therein a plurality of grooves extending at an angle to the axis thereof, said grooves being of right and left hand and of varying pitch, means for mounting said body for rotation on its long axis on the axis of rotation of a propeller, means for securing said body at different stations in its rotation on said axis corresponding with the blades of a propeller, a collar encircling the body and having longitudinal movement thereon, a reciprocable pin member carried by the collar for selective engagement in said grooves, and an indicator unit carried by the collar and including a plurality of adjustably held contact members arranged on a line extending longitudinally of a blade of the propeller and movable across the face of said blade along a prescribed path defined by the groove in which said finger is engaged.

10. A propeller blade checking gauge, comprising a cylinder body, means for coupling said body with a propeller to be checked whereby the body may have rotation on its long axis and on the axis of rotation of the propeller, the body having a plurality of pitch grooves in the surface thereof extending at an angle to its long axis, the grooves being of varying angles, a collar encircling the body and adapted to turn thereabout and to move longitudinally thereon, means carried by the collar for selective engagement in said pitch grooves to cause the collar to move about the cylinder body along a fixed path corresponding to a predetermined propeller blade pitch, a rod member coupled to and movable with the collar and extending in parallel relation with the body, an arm carried by the rod and extending transversely thereof, the arm being adjustably attached to the rod for disposition longitudinally of and in parallel relation with a propeller blade, and a plurality of contact fingers carried by the arm and extending transversely thereof for contact with a face of the propeller blade, the fingers being held for adjustable movement transversely of the arm.

11. In a gauge for checking propeller measurements, a supporting body such as an arbor, spindle and the like, a cylindrical head adapted to be secured to and coaxially with the said supporting body, a cylindrical body coupled with said head and extending in the direction of the axis of the supporting head, the said coupling means facilitating the turning of the cylindrical body about an axis paralleling the axis of the propeller, means for securing the cylindrical body at fixed positions in its rotation about the last-mentioned axis, such positions being spaced in degrees corresponding with the degree spacings of the blades of the adjacent propeller, the cylindrical body having right and left-hand pitch grooves in the surface thereof and extending obliquely of the cylindrical body, a collar encircling the cylindrical body, a pitch groove engaging finger carried by the collar, and an indicator connected with said collar and so constructed and arranged that upon rotation of the collar with said finger engaged in a pitch groove the indicator will follow a path corresponding to the pitch of a blade adjacent to which it is located.

12. In a gauge for checking measurements of a propeller, a support such as a shaft, spindle and the like, an elongated cylindrical head adapted to be secured at one end to the support to extend longitudinally thereof and coaxially therewith, a cylinder in the form of a sleeve encircling said cylindrical head, means for securing the sleeve at fixed positions on the head when the sleeve is rotated thereon, said sleeve having a plurality of pitch grooves of right and left hand formed therein and extending obliquely thereof at different angles to the axis of the sleeve, a pair of stop rings encircling the sleeve, a collar encircling the sleeve between said rings, a shiftable finger member carried by the collar for selective engagement in the pitch grooves, and an indicator unit connected to the collar and comprising a rod extending parallel with the axis of the sleeve and adjustable longitudinally on the collar, an arm pivotally attached to the rod to extend longitudinally of a propeller blade, a plurality of pin members extending transversely of the arm and adapted to engage an adjacent blade, and said pin members being resiliently held for movement transversely of the arm.

13. In an instrument for checking propeller measurements, a support such as a shaft, spindle and the like, a cylindrical head adapted to be secured to said support coaxially with the propeller, a sleeve encircling and adapted to be rotated about the head, means for securing the sleeve in different positions of rotation on the head, a second cylindrical body, means coupling the second body with said sleeve for disposing the second body above the first body at an inclination from the vertical, said second body having a plurality of pitch grooves formed therein and extending obliquely thereof, the pitch grooves being at different oblique angles, a collar encircling the second body and having longitudinal movement thereon, a reciprocable pin carried by the collar for selective engagement in the pitch grooves, and an indicator unit carried by the collar and comprising a rod secured in a position parallel with the axis of the second body, an arm pivotally attached to the rod for extension longitudinally of and parallel with a propeller blade, and a plurality of finger members carried by the arm for traversing a face of the blade.

14. In an instrument for checking measurements of a propeller, a support in the form of a shaft, spindle and the like, a cylindrical head body adapted to be secured to said support coaxially therewith, a sleeve encircling the head body for rotation thereon, means for securing the sleeve to the head body in different positions of rotation, an arm pivotally attached to the sleeve for oscillation on an axis extending perpendicular to the axis of the body, a second and relatively long cylindrical body secured at one end to the arm to extend perpendicularly thereto, the second body having a plurality of obliquely directed pitch grooves formed therein and obliquely thereof and having different oblique angles, a collar encircling the second body, a finger member carried by the collar and adapted for selective engagement in the pitch grooves, an indicator unit carried by the collar and comprising an elongated portion secured parallel with the axis of the second body, an arm portion pivotally coupled to the said elongated portion to be disposed in a position parallel with the length of a propeller blade, and a plurality of indicator fingers carried by the arm for movement therewith with respect to the face of the adjacent blade.

15. In an instrument for checking propeller measurements, a support such as a shaft, spindle and the like, a relatively long body of circular cross-section, means for coupling said body with the propeller support whereby the body extends lengthwise of the axis of rotation of the propeller and by which the body can be turned about the same axis as the axis of the propeller, a plurality of pitch grooves formed in and obliquely of the body, the pitch grooves being of intersecting right and left hand and at varying oblique angles, a collar encircling the body, a spring pressed finger carried by the collar and normally urged inwardly for selective engagement in the pitch grooves, said finger at its outer end having a pointer head, the body having indicia thereon adjacent each of the pitch grooves designating a propeller pitch, said body having a pair of sight openings adjacent said pin head through which the indicia of a pitch groove of selected hand may be observed, the pointer head being directed toward the aperture corresponding to the pitch groove in which the pin is engaged, and an indicator unit connected with the collar and comprising an elongated portion secured in parallel relation with the collar, and an arm portion pivotally attached to the elongated portion for disposition in parallel relation with a propeller blade, the arm portion carrying a pointer finger.

HAROLD I. JOHNSON.